(No Model.) 2 Sheets—Sheet 1.
J. A. CALLAWAY.
BROADCAST SEEDER.
No. 429,229. Patented June 3, 1890.
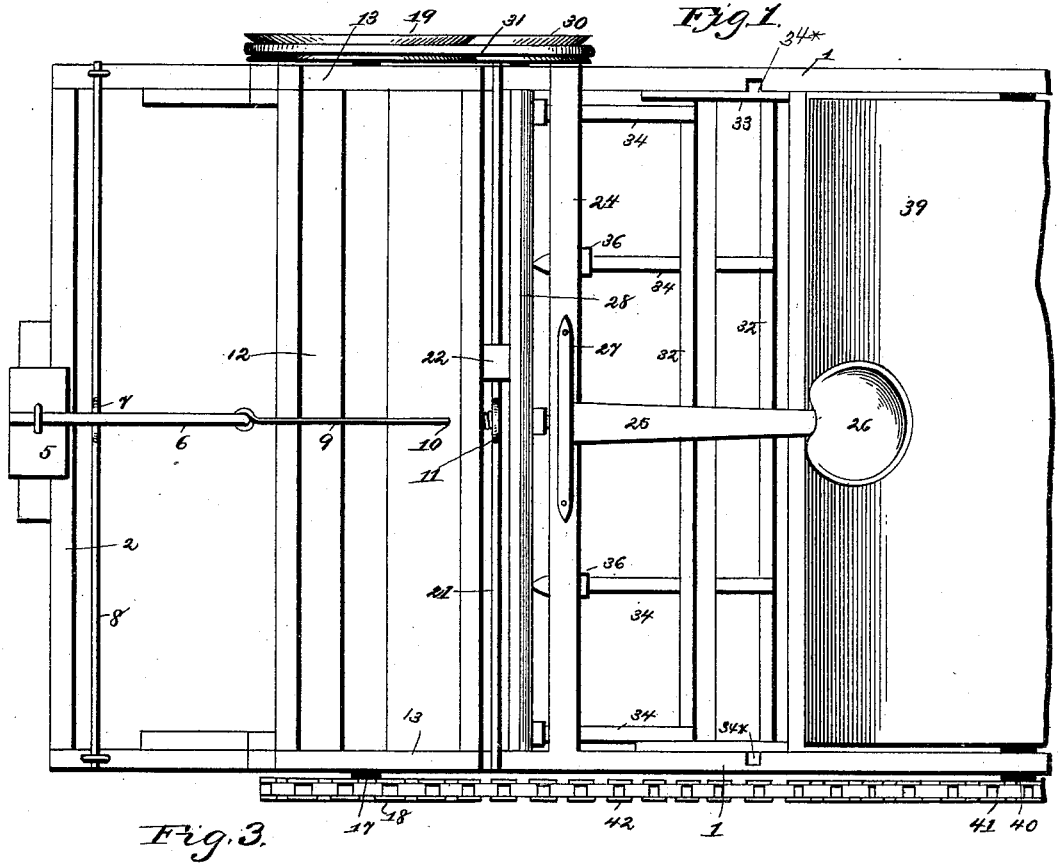
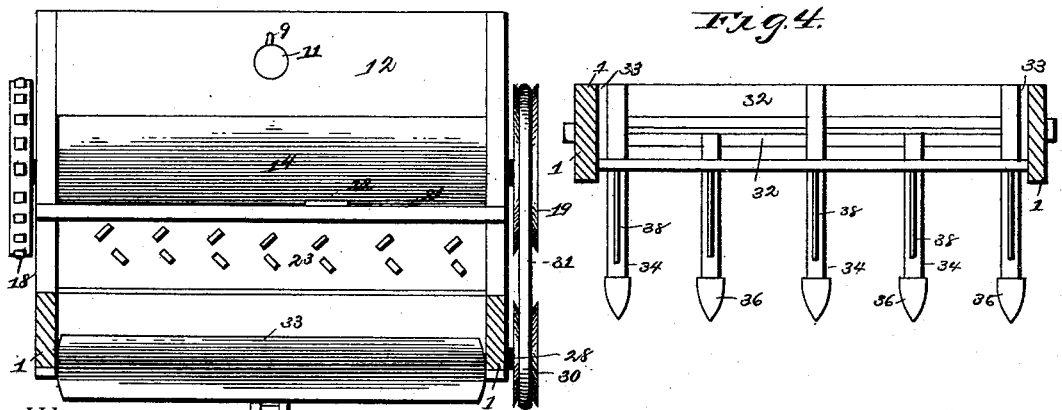
Witnesses:
E. Wurdeman
W. P. Duvall
Inventor
Johnathan A. Callaway
By his Attorneys,
C. A. Snow & Co.

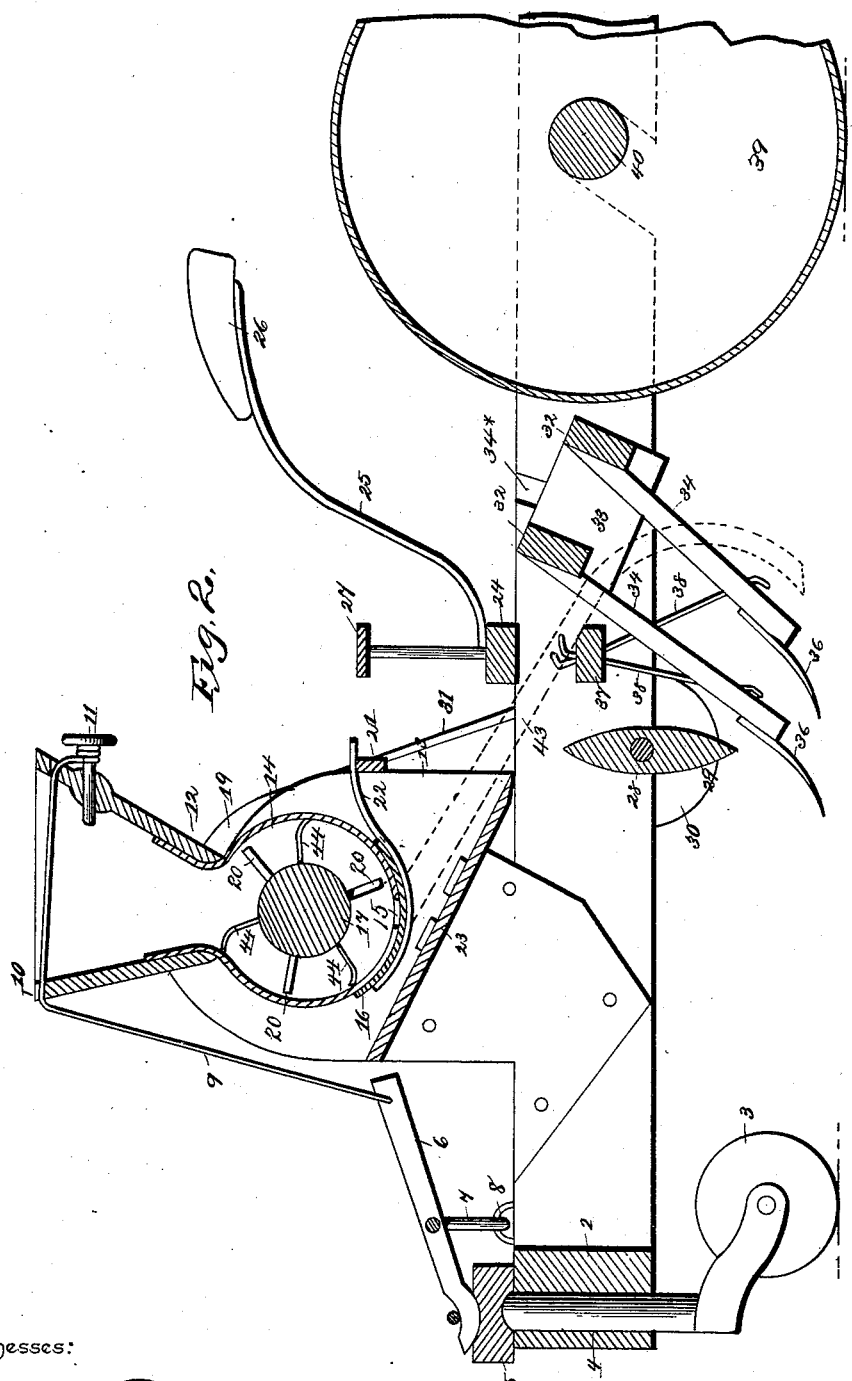

UNITED STATES PATENT OFFICE.

JOHNATHAN ASA CALLAWAY, OF LAMPASAS, TEXAS.

BROADCAST SEEDER.

SPECIFICATION forming part of Letters Patent No. 429,229, dated June 3, 1890.

Application filed August 10, 1889. Serial No. 320,412. (No model.)

*To all whom it may concern:*

Be it known that I, JOHNATHAN ASA CALLAWAY, a citizen of the United States, residing at Lampasas, in the county of Lampasas and State of Texas, have invented a new and useful Broadcast Seeder, of which the following is a specification.

This invention has relation to broadcast seeders, and among the objects in view are to cultivate, plant, and subsequently roll or cover the seed, the elements for accomplishing the same being combined in a single device simply constructed, all as will hereinafter appear from the following description, in which—

Figure 1 is a plan of a seeder constructed in accordance with my invention; Fig. 2, a central section, and Fig. 3, a transverse section of the same; Fig. 4, a detail of the cultivator and its supporting-frame.

Like numerals of reference indicate like parts in all the figures of the drawings.

In practicing my invention I provide a rectangular frame consisting of opposite side bars 1 and end bars 2, and support the forward end of the same by means of a caster-wheel 3, mounted in a bearing 4, the shank of the caster being vertically movable therein for the purpose of obtaining different adjustments, and terminating in a bearing-block 5, to which is connected the outer end of an adjusting-lever 6, pivoted on an offset 7 of a transverse bar 8. To the rear end of the lever is connected an adjusting cord or chain 9, the same being passed through the guide-openings 10, located in the hopper, and having its remaining portion wound around an adjusting-screw 11, inserted in the rear wall of the hopper.

12 represents the hopper, which is supported in suitable standards 13, rising from the side bars 1, the lower portion of the hopper being substantially cylindrical, as at 14, and provided with a series of seed-openings 15, covered by a slide 16, perforated to agree with those in the hopper, and adapted to be adjusted to increase or diminish the amount of seed discharged. An agitator-shaft 17 is mounted in the cylindrical portion 14 of the hopper, and is provided at one end, outside of the standards 13, with a sprocket-wheel 18, and at its opposite end with a grooved pulley 19, and within the hopper with the usual agitator-arms 20. A transverse bar 21 connects the rear ends of the standards 13 below the cylindrical portion 14 of the hopper, and from the same there projects inwardly a flat spring 22, the end of which bears against the under surface of the seed-slide, and thereby retains the slide in an adjusted position.

23 represents an inclined seed-board mounted between the two standards 13, under the cylindrical portion of the hopper 14, and inclined to the rear and adapted to receive seed from the hopper. The surface of the seed-board is provided with intersecting series of oppositely-disposed inclined cleats, whereby the seed dropped thereon is uniformly scattered broadcast.

Upon a transverse bar 24 is mounted the seat-standard 25, at the upper end of which is the driver's seat 26, a foot-rest 27 being mounted upon the bar 24 in front of the standard.

In rear of the hopper, and about on a vertical line with the rear edge of the seed-board 23 within the side frames 1, I journal a shaft 28, provided at opposite sides with longitudinal fins or paddles 29. One end of the shaft projects beyond the side 1 of the frame and carries a grooved pulley 30, and upon the same is mounted a belt 31, also passing over the grooved pulley 19, by which motion is conveyed from the pulley 19 to pulley 30 and the paddle-shaft. The latter pulley being smaller than the former, said shaft is rotated at a considerably greater speed than the agitator upon the shaft on which the pulley 19 is mounted. By means of the paddle-shaft the seed is thoroughly scattered and evenly distributed.

32 represents a pair of oppositely-inclined transverse beams, the ends of which are connected by blocks 33, pivoted, as at 34*, within the sides of the frame 1. From each of the beams 32 project cultivator-standards 34, each depending in an inclined manner and provided at their ends with ordinary shovels 36. A transverse bar 37 is mounted rigidly in the sides 1 in front of the cultivator-beams, and is provided with a series of preferably yielding links 38, the links agreeing in number with the standards, and each standard being connected to the bar 37 by a link.

39 represents a roller removably mounted on a shaft 40, journaled in the sides 1 in the rear portion of the frame-work, and provided at one side upon the shaft 40 with a large sprocket-wheel 41, which rotates with the shaft 40, and is connected with and drives the sprocket 17 of the agitator-shaft by means of a chain 42. It will thus be seen that the seed in the hopper is constantly agitated, fed in quantities upon the inclined seed-board, evenly distributed over the board, and dropped upon the paddle-shaft, whereby it is scattered in advance of the shovels, the ends of which are slightly in rear of the paddle-shaft, the seed thereby turned under, after which the furrows are rolled and the seed covered. By providing the cylindrical portion 14 for the hopper the agitating-shaft is relieved of the weight of the seed within the hopper, so that no obstruction to the easy running of the machine as a whole is offered in this regard.

43 (in dotted lines) represents a seed-chute, the upper end of which is connected with one of the seed-openings, and the rear or lower end is in rear of one of the plows or shovels, whereby seed is fed and delivered in the furrow and planted or drilled in line. Any number of these chutes may be employed, and the same are removable, so that the planter may be changed to a broadcast-seeder when desired.

44 represents small spring-arms projecting from the agitator-shaft opposite each of the seed-openings and adapted to rotate in contact with its respective opening. By this device the seed-openings are prevented from clogging and are always maintained clear. The roller is made removable in this instance, in order that ordinary ground-wheels may be substituted therefor when desired. From this construction it is apparent that the machine may be used as a seed-drill with or without the roller, and as a broadcast-planter with or without either roller or shovels.

Having described my invention, what I claim is—

1. The combination, with the frame-work of a seeder, of a transverse cultivator-beam pivotally mounted in the frame-work and provided with a series of inclined depending cultivator-standards terminating in shovels, a transverse beam mounted in front of the cultivator-beam, and resilient rods or links depending from the beam and each connected at its lower end to one of the standards, substantially as specified.

2. The combination, with the frame of a seeder, of a pair of longitudinally-opposite cultivator-beams the ends of which are connected by a head-block forming a frame and provided with trunnions pivoted in the frame, a series of cultivator-standards depending from the beams and those of one beam alternating with those of the other, a transverse bar mounted in front of the standards, and spring-rods or links depending from the bar and connecting each standard with the transverse bar, substantially as specified.

3. The combination, in a seeder, of a rectangular frame supported at one end by an adjustable caster, and means for adjusting the same, a pair of standards mounted on the frame, the hopper supported by the standards, a seed-board inclined between the standards, an agitator-shaft mounted in the hopper and provided at one end with a pulley and at the opposite end with a sprocket-wheel, a pivoted cultivator-beam mounted in rear of the seed-board and yieldingly connected to a transverse bar, a paddle-shaft mounted intermediate and in rear of the seed-board and in advance of the cultivator-beams and provided with a pulley connected to that of the agitator-shaft, and a roller mounted in rear of the cultivator-beams, the shaft of which is provided with a sprocket connected to that of the agitator, substantially as specified.

4. The combination, with the frame of a seeder, the opposite sides of which are provided with bearings, of a transversely-arranged cultivator-frame removably mounted in the bearings and having a series of depending standards provided with shovels, substantially as specified.

5. The combination, with the frame of a seeder provided with opposite slots terminating in bearings, of a cultivator-frame provided with end trunnions removably mounted in the bearings and with a series of depending shovel-standards, a transverse bar or beam mounted on the frame of the seeder in front of the cultivator-frame, and a series of resilient rods or links depending from the beam and each detachably connected at the lower end to a shovel-standard, substantially as specified.

In testimony that I claim the foregoing as my own I have hereto affixed my signature in presence of two witnesses.

JOHNATHAN ASA CALLAWAY.

Witnesses:
WEBSTER MILLER,
D. J. MORRIS.